United States Patent [19]

Kumaoka

[11] Patent Number: 5,062,097
[45] Date of Patent: Oct. 29, 1991

[54] AUTOMATIC MUSICAL INSTRUMENT PLAYBACK FROM A DIGITAL MUSIC OR VIDEO SOURCE

[75] Inventor: Michiaki Kumaoka, Hamamatsu, Japan

[73] Assignee: Yamaha Corporation, Hamamatsu, Japan

[21] Appl. No.: 305,514

[22] Filed: Feb. 1, 1989

[30] Foreign Application Priority Data

Feb. 3, 1988 [JP] Japan ................................ 63-23593

[51] Int. Cl.⁵ .......................... G11B 33/00; G10F 1/00
[52] U.S. Cl. ...................................... 369/70; 360/79; 84/4; 84/712; 84/645; 84/666; 358/335
[58] Field of Search ................ 84/600, 601, 602, 610, 84/645, 666, 712, 4; 369/70; 360/55, 79, 19.1; 358/335, 341, 343

[56] References Cited

U.S. PATENT DOCUMENTS 4,419,920 12/1983 Ohe .................................. 360/79 X

Primary Examiner—Robert L. Richardson
Attorney, Agent, or Firm—Spensley Horn Jubas & Lubitz

[57] ABSTRACT

A device for playing back a music or video source such as a digital audio tape recorder, Compact Disc, Laser Vision Disc, video tape recorder, television and FM broadcasting and analog records comprises means responsive to control information supplied from a music or video source device for controlling an externally controllable electrical or electronic musical instrument so as to perform the musical instrument automatically in synchronism with playback of the source device. An electrical or electronic musical instrument is performed automatically in synchronism with playback of a source so that a reproduction atmosphere which cannot be obtained by mere playback of the source can be created.

6 Claims, 3 Drawing Sheets

AUTOMATIC MUSICAL INSTRUMENT PLAYBACK FROM A DIGITAL MUSIC OR VIDEO SOURCE

BACKGROUND OF THE INVENTION

This invention relates to a device for playing back a music or video source and, more particularly, to a device of this type capable of performing an electrical or electronic musical instrument automatically in synchronism with playback of such music or video source and thereby creating a reproduction atmoshpere which cannot be obtained by mere playback of the source.

Playback of a musical or video source such as DAT (digital audio tape recorder), CD (Compact Disc), LV (Laser Vision Disc), VTR (video tape recorder), television and FM broadcasting and analog records is generally performed by reproducing a musical or video signal obtained from such source by means of a loudspeaker, television monitor or the like device.

The conventional playback devices capable of merely reproducing a music or picture recorded on a source however is limited in their reproduction atmosphere.

It is an object of the invention to provide a music/video source playback device capable of removing this limitation and creating a reproduction atmosphere which cannot be obtained by mere playback of a source device.

SUMMARY OF THE INVENTION

The music/video source playback device achieving the above described object of the invention comprises means responsive to control information supplied from a music or video source device for controlling an externally controllable electrical or electronic musical instrument so as to perform the musical instrument automatically in synchronism with playback of the source device.

According to the invention, an electrical or electronic musical instrument is performed automatically in synchronism with playback of a source so that a reproduction atmoshpere which cannot be obtained by mere playback of the source can be created.

As the control information, information according to the MIDI (Musical Instrument Digital Interface) standard, for example, can be employed. If the MIDI standard information is used as control information, different types of musical instruments of the MIDI standard can be used so that different reproduction atmosphere can be enjoyed by changing the musical instrument used. If the musical instrument is a piano with an automatic performance function, a visual performance effect can be obtained by utilizing the device according to the invention.

If a source device such as a DAT by which a user can record and reproduce information is used, the device of the invention can be utilized for performing functions such as after recording.

Embodiments of the invention will now be described with reference to the accompanying drawings.

BRIEF DESCRIPTION OF THE DRAWINGS

In the accompanying drawings.

DESCRIPTION OF PREFERRED EMBODIMENTS

Figure 1:
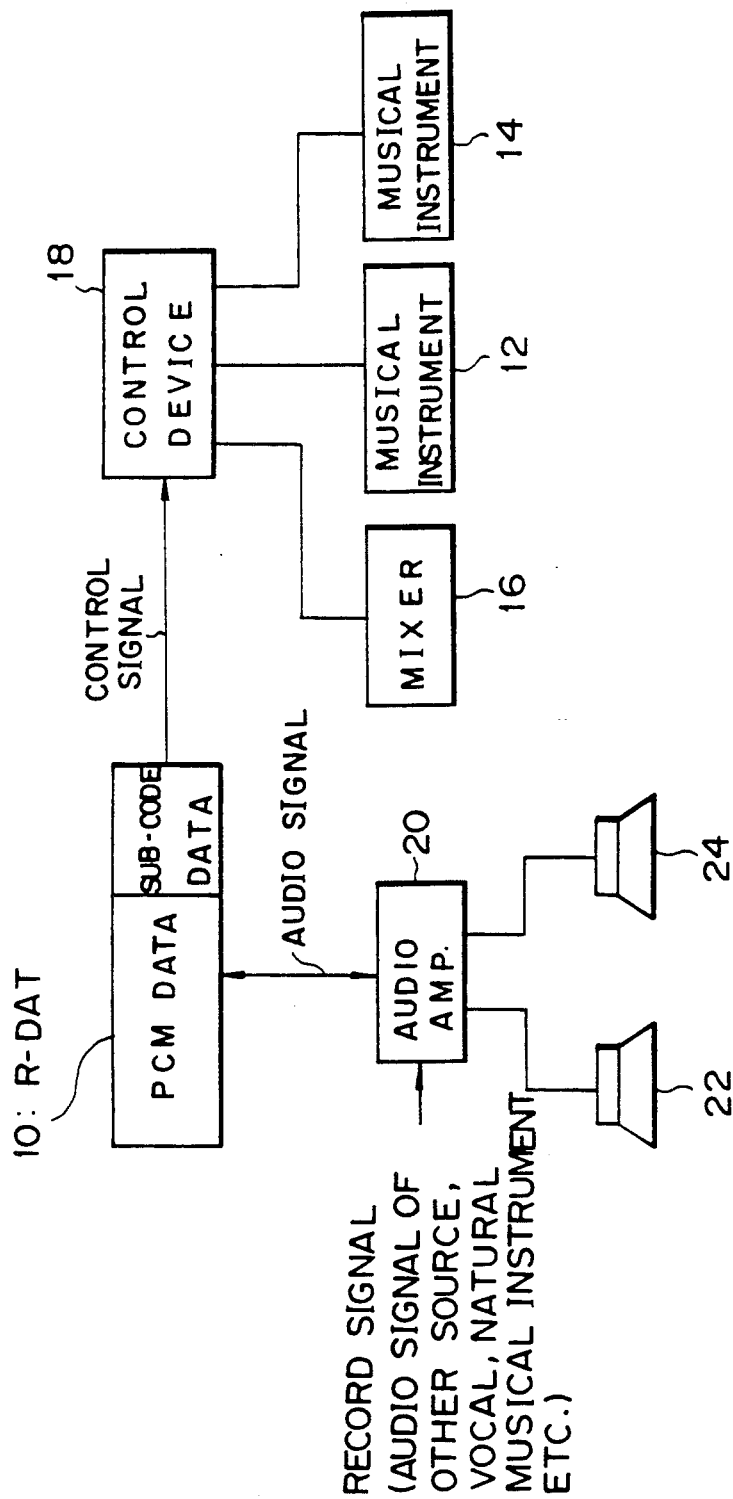
FIG. 1 is a block diagram showing an embodiment of the invention.

FIG. 1 shows an embodiment of the music/video source playback device according to the invention. In this embodiment, two musical instruments 12 and 14 which can be controlled from outside are performed automatically in synchronism with playback of an R-DAT (rotary head type digital audio tape recorder) 10. As the musical instruments 12 and 14, electrical or electronic musical instruments such as an electronic keyboard, electronic drums, rhythm machine, music synthesizer and electronic piano (preferably automatic performance type) may be used. As an atttachment to the musical instruments, a mixer (such as a digital mixer) 16 is provided for performing controls including adjustment of mixing level of tones of these musical instruments 12 and 14 or mixing level of tones of these musical instruments 12 and 14 and a reproduced tone of the R-DAT 10 and changing of tone quality.

An audio signal from other source (e.g., a CD player, recorder player or FM tuner) or an audio signal of voice or natural musical instrument is applied to a record input terminal of the R-DAT 10 through an audio amplifier 20 an is recorded on a PCM region of a tape. Performance information from the musical instruments 12 and 14 and operation information from the mixer 16 are applied as control information for automatic performance to a control signal input terminal of the R-DAT 10 through a control device 18 and is recorded in a sub-code region of the tape. The control device 18 performs control so that the operation information is recorded in a predetermined format in the sub-code region of the tape. The control device 18 may be provided in the R-DAT 10.

If the tape on which the audio signal and the control information for automatic performance (performance information of the musical instruments 12 and 14 and the operation information of the mixer 16) are recorded is played back by the R-DAT 10, the audio signal is provided from a reproduced output terminal and sounded from main loudspeakers 22 and 24 through the audio amplifier 20. The control information for automatic performance is simultaneously provided from a control signal output terminal of the R-DAT 10 and supplied to the musical instruments 12 and 14 through the control device 18 for the automatic performance.

The automatic performance tones of the musical instruments 12 and 14 are sounded from loudspeakers attached to these musical instruments 12 and 14 or outside loudspeakers or main loudspeakers 22 and 24 through the mixer 16. The mixer 16 performs automatic adjustment of mixing level and automatic changing of tone quality in accordance with the control information for the automatic performance reproduced from the R-DAT 10.

Figure 2:
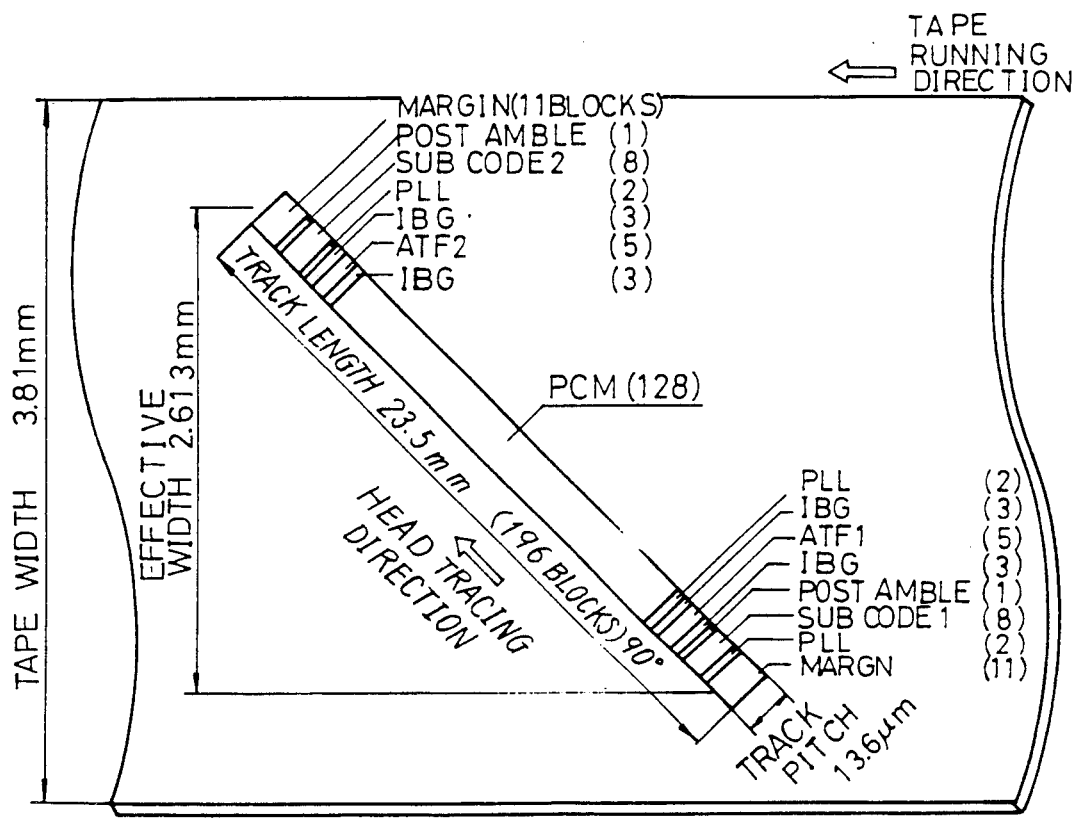
FIG. 2 is a diagram showing a track format of an R-DAT.

A specific example of recording of the control information for automatic performance in the sub-code region will now be described. The track format of the R-DAT is so made that, as shown in FIG. 2, an audio signal converted to PCM data is recorded in the central PCM region and control signals such as sub-codes and AFT (automatic track finding) are recorded on both sides of the PCM region on the track.

Figure 3:
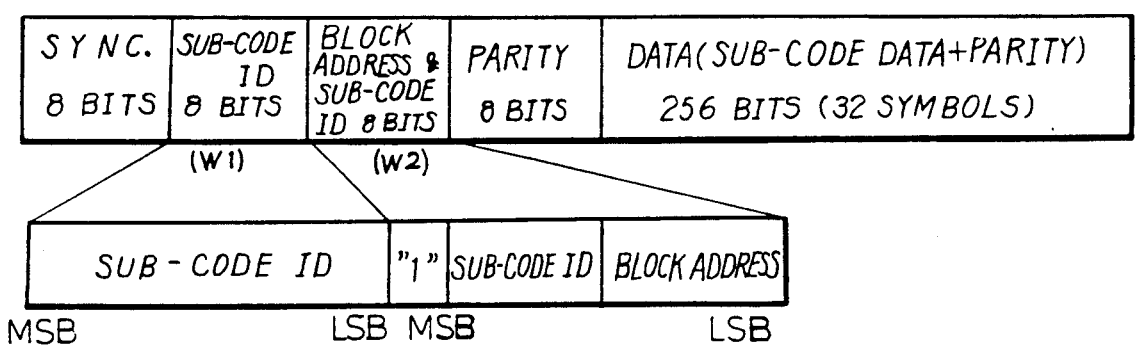
FIG. 3 is a diagram showing a format of a sub-code region of the R-DAT.

One sub-code region consists of eight blocks and each block has record regions of blocks sync, sub-code ID, sub-code ID and block address, parity check code for these subcode ID and block address and sub-code data as shown in FIG. 3. The sub-code data itself is imparted with parity code every other block. The sub-code region can be rewritten by after recording operation.

Figures 4, 5:
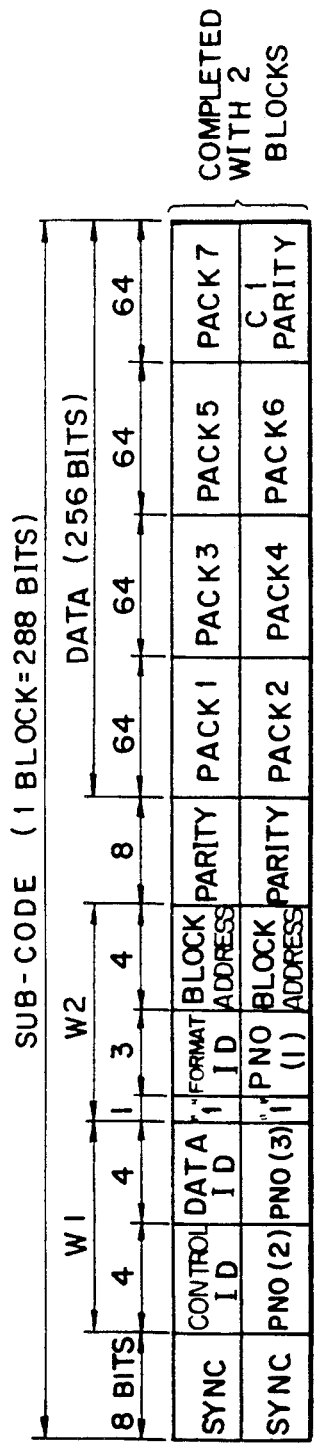
FIG. 4 is a diagram showing a format of a sub-code region of the R-DAT in detail.
FIG. 5 is a diagram showing a pack format of the sub-code region of the R-DAT.

As shown in detail in FIG. 4, each block of the sub-code region consists of 288 bits and a set of data consists of two blocks. Each block consists of 8-bit sync, 16-bit header section (W1, W2), 8-bit parity and 256-bit sub-code data.

In the header section are recorded control ID, data ID, format ID, block address and program numbers represented by three-digit BCD code PNO (1), (2) and (3). Parity is prepared for data of W1 and W2.

For the sub-code, PACK is made by 64 bits and seven PACKs and C1 parity (64 bits) are recorded in two blocks. Each PACK is made in the format shown in FIG. 5. The contents (e.g., program time, absolute time, running time, calender and catalog) of each PACK are identified by the code of "Item". FIG. 5 shows a PACK format for the Item ("0001") of program time.

According to the current R-DAT standard, contents of Items "1000", "1001", "1010", "1011", "1100", "1101"and "1110"have not been determined yet so that control information for automatic performance can be recorded by utilizing these Items.

As the control information for automatic performance, information based on the MIDI standard, for example, may be employed. The MIDI standard was created for the purpose of providing input and output terminals of a standard which is common to electronic musical instruments, rhythm boxes, automatic performance devices (sequencers) and the like and thereby rendering musical data transmitted through these instruments and devices interchangeable. Musical instruments of the MIDI standard can be interconnected and performed simultaneously notwithstanding that these musical instruments are not the same products or products of the same manufacturer. Performance information which can be transmitted in accordance with the MIDI standard includes musical instrument identity information, key information, bend information of a synthesizer, sustain pedal information and tone color changing information. If, accordingly, musical instruments of the MIDI standard are used as the musical instruments 12 and 14 of FIG. 1, output information of thse musical instruments can be recorded on the R-DAT 10 and automatically performed.

Recording according to the system of FIG. 1 can be made by one of the following methods:

1. Method of recording an audio signal and control information for automatic information simultaneously While the musical instrument 12 or 14 or both are performed, an audio signal of voice or other musical instrument is applied as a record signal to the R-DAT 10 while operating the mixer 16. During record mode of the R-DAT 10, the audio signal is converted to PCM data and recorded in the PCM region of the tape. Simultaneously, the performance of the musical instrument 12 or 14 or both and the operation information (e.g., information based on the MIDI standard) of the mixer 16 are imparted with the code Item representing the control information for automatic performance and recorded in the sub-code region.

2. Method of after recording the control information for automatic performance

An audio signal is previously recorded in the PCM region of the tape. While reproducing this audio signal, the musical instruments 12 and 14 and the mixer 16 are operated simultaneously in synchronism with the music so that the performance information from these musical instruments 12 and 14 and the operation information of the mixer 16 are after recorded in the sub-code region as the control information for automatic performance.

3. After recording of an audio signal

Conversely to the method described in 2 above, the musical instruments 12 and 14 and the mixer 16 are previously operated and the performance information and operation information are recorded as the control information for automatic performance. While these information are reproduced for automatic performance, an audio signal (voice or natural musical instrument) is after recorded in the PCM region in synchronism with the automatic performance.

By playing back the tape on which information is recorded in accordance with any one of the above described methods, the automatic performance of the musical instruments 12 and 14 and the automatic operation of the mixer 16 can be made simultaneously with performance of the audio signal recorded in the PCM region.

In the above described embodiment, the control information is recorded in accordance with the MIDI standard. It should be noted that the control information may be recorded in accordance with other standard.

In the above described embodiment, an R-DAT is used as the source playback device. Other source device may also be employed. In that case, recording of control information for automatic performance may be made, for example, in one of the following manners:

(1) CD, LV

Predetermined control information is recorded in the sub-code region when a disc is produced by a manufacturer. As to a DRAW disc or E-DRAW disc on which a user can record data, a user may record control information in the same manner as described with respect to the R-DAT.

(2) VTR

If the source device is a conventional analog video recording and analog audio recording VTR, recording or reproduction of the control information can be made as data superposed on an audio signal. For example, the current high-fidelity audio recording system (the deep layer recording system in VHS) can be utilized as an external musical instrument control signal recording system. The control signal may be either one according to the MIDI standard or one according to other standard.

If a digital video recording system is employed in a VTR in future, a sub-code region will be provided in the tape in the same manner as in the tape for a DAT so that control information can be recorded by using this sub-code region.

In any case, after recording can be realized in a VTR as in a DAT so that a user can record control information on a tape for a VTR at will.

If control information for background music is additionally recorded so that the background music can be performed automatically by a musical instrument in synchronism with reproduction of a video signal, a video information such as one recorded by an individual can be reproduced while the background music is performed by the automatic performance.

(3) Tape and disc record on which analog signals are recorded and TV, FM and AM broadcasting in analog signals.

In these cases, control information can be recorded or transmitted as data superposed on analog signals. For example, a signal obtained by converting the control information by amplitude modulation, frequency modulation or phase modulation is recorded or transmitted over a subcarrier in the same manner as in the current bilingual TV broadcasting, and then a conventional playback device can be used without modification.

(4) Digital TV and FM broadcasting

Since signals are processed digitally, control information can be transmitted by inserting it at intervals of a main signal.

What is claimed is:

1. A music/video source playback device which provides musical instrument accompaniment comprising:
   a music/video source playback device of the type in which audio or video signals to be reproduced are recorded in digital form in a program region of a recording medium and a control region is provided in the medium separate from the program region for recording digital control signals in addition to the audio or video signals to be reproduced, the playback device including means for separating the audio or video signals to be reproduced from the control signals during playback and providing the separated audio or video signals to appropriate audio/video reproduction equipment; and
   control means for detecting portions of the control signals as representing control information for controlling an external musical instrument and providing the control information as an output to the external musical instrument.

2. A music/video source playback device as in claim 1 wherein the control information is recorded in accordance with the MIDI format.

3. A music/video source playback device as in claim 1 wherein the source playback device is a DAT playback device and wherein the recording medium includes a PCM program region and a subcode control region.

4. A method of providing musical instrument accompaniment for music/video playback, comprising the steps of:
   providing a music/video playback device for playing music/video media of the type which includes digital audio or video program data and separate digital control data;
   detecting portions of the control data as containing data for controlling an external musical instrument; and
   providing the detected portions to an external muscial instrument to cause it to perform in synchronism with the reproduction of the program data.

5. The method of claim 4 wherein the data for controlling an external musical instrument is data having a MIDI format.

6. The method of claim 5 wherein the playback device is a DAT playback device and the media includes a PCM region in which program data is recorded and a subcode region in which control data including the data for controlling an external musical instrument.

* * * * *